United States Patent
Liu et al.

(10) Patent No.: US 12,231,779 B2
(45) Date of Patent: Feb. 18, 2025

(54) METHOD AND APPARATUS FOR GENERATING LOW BIT WIDTH HDR IMAGE, STORAGE MEDIUM, AND TERMINAL

(71) Applicant: SPREADTRUM COMMUNICATIONS (SHANGHAI) CO., LTD., Shanghai (CN)

(72) Inventors: Chunting Liu, Shanghai (CN); Danfeng Jie, Shanghai (CN); Xiaomeng Zhang, Shanghai (CN); Huan Chen, Shanghai (CN); Xiaofeng Peng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 385 days.

(21) Appl. No.: 17/794,409

(22) PCT Filed: Mar. 19, 2021

(86) PCT No.: PCT/CN2021/081721
§ 371 (c)(1),
(2) Date: Jul. 21, 2022

(87) PCT Pub. No.: WO2021/148057
PCT Pub. Date: Jul. 29, 2021

(65) Prior Publication Data
US 2023/0069014 A1    Mar. 2, 2023

(30) Foreign Application Priority Data
Jan. 21, 2020    (CN) .......................... 202010071654.9

(51) Int. Cl.
*G06T 7/11* (2017.01)
*G06T 5/40* (2006.01)
(Continued)

(52) U.S. Cl.
CPC .............. *H04N 23/741* (2023.01); *G06T 5/40* (2013.01); *G06T 5/50* (2013.01); *G06T 7/11* (2017.01);
(Continued)

(58) Field of Classification Search
CPC .... H04N 23/741; H04N 23/667; H04N 23/80; H04N 19/98; H04N 19/136;
(Continued)

(56) References Cited

U.S. PATENT DOCUMENTS 9,413,980 B1 * 8/2016 Qi ........................ H04N 23/741
2019/0313005 A1 * 10/2019 Kuang ...................... H04N 9/73
(Continued)

FOREIGN PATENT DOCUMENTS

| CN | 102186020 A | 9/2011 |
|---|---|---|
| CN | 103325098 A | 9/2013 |

(Continued)

OTHER PUBLICATIONS

International Search Report for International Application No. PCT/CN2021/081721; Date of Mailing, Jun. 18, 2021.
(Continued)

*Primary Examiner* — Negussie Worku
(74) *Attorney, Agent, or Firm* — CANTOR COLBURN LLP

(57) ABSTRACT

A method and an apparatus for generating an HDR image with low bit width, a storage medium, and a terminal are provided. The method includes: determining a to-be-processed HDR image with high bit width; splitting the to-be-processed HDR image with high bit width to obtain N frames of split images which include a first frame to an Nth frame; performing bit width reduction processing on the N frames of split images respectively, to obtain N frames of low-bit-width images; and synthesizing the N frames of
(Continued)

low-bit-width images to obtain the HDR image with low bit width.

20 Claims, 8 Drawing Sheets

(51) Int. Cl.
　　*G06T 5/50*　　　　(2006.01)
　　*H04N 23/741*　　 (2023.01)
(52) U.S. Cl.
　　CPC ............... *G06T 2207/20208* (2013.01); *G06T 2207/20221* (2013.01)
(58) Field of Classification Search
　　CPC .... H04N 19/184; H04N 19/102; H04N 23/81; H04N 23/84; G06T 5/40; G06T 5/50; G06T 7/11; G06T 2207/20208; G06T 2207/20221; G06T 5/92
　　USPC ........................................................ 358/274
　　See application file for complete search history.

(56) References Cited

U.S. PATENT DOCUMENTS

| 2022/0078324 A1* | 3/2022 | Yu ......................... G06F 18/251 |
| 2023/0038844 A1* | 2/2023 | Li ........................... H04N 23/741 |
| 2023/0069014 A1* | 3/2023 | Liu ............................ G06T 5/40 |

FOREIGN PATENT DOCUMENTS

| CN | 105513029 A | 4/2016 |
| CN | 105744157 A | 7/2016 |
| CN | 105827971 A | 8/2016 |
| CN | 106851138 A | 6/2017 |
| CN | 110049332 A | 7/2019 |
| CN | 111292282 A | 6/2020 |

OTHER PUBLICATIONS

CNIPA The First Office Action for corresponding CN Application No. 202010071654.9; Issued on Sep. 2, 2022.

* cited by examiner

METHOD AND APPARATUS FOR GENERATING LOW BIT WIDTH HDR IMAGE, STORAGE MEDIUM, AND TERMINAL

CROSS-REFERENCE TO RELATED APPLICATIONS

This application is the U.S. national stage of International Application No. PCT/CN2021/081721, filed on Mar. 19, 2021. Priority under 35 U.S.C. § 119(a) and 35 U.S.C. § 365(b) is claimed from Chinese Patent Application No. 202010071654.9, filed on Jan. 21, 2020, the entire disclosure of which is incorporated herein by reference.

TECHNICAL FIELD

The present disclosure generally relates to communication technology field, and more particularly, to a method and apparatus for generating a High Dynamic Range (HDR) image with low bit width, a storage medium, and a terminal.

BACKGROUND

An image signal processing apparatus receives raw data from an image sensor, processes the raw data, and outputs an image that is displayable on a screen. High dynamic range (HDR) images usually have higher bit width and contain more brightness and detail information. An HDR image may be acquired by synthesizing multiple frames of different exposure images into one frame of HDR image or synthesizing multiple frames of equal exposure images into one frame of HDR image, or outputting from an image sensor with an HDR function. To preserve complete information of HDR data, a signal processing apparatus capable of receiving and processing high-bit-width images is required.

A maximum bit width of images that can be processed by existing image processing systems and apparatuses is usually lower than that of HDR images. With the development of HDR technology, there are more and more applications of HDR image processing. To guarantee image accuracy, an image processing system that supports high bit width input is usually required. When a low-bit-width image processing system processes HDR images with high bit width, high-bit-width image data needs to be reduced in bit width in advance.

SUMMARY

In embodiments of the present disclosure, a method and apparatus for generating an HDR image with low bit width, storage medium, and a terminal are provided, which may effectively reduce a precision loss of graphics and achieve better image processing effect while reducing bit width of data.

In an embodiment of the present disclosure, a method for generating an HDR image with low bit width is provided, including: determining a to-be-processed HDR image with high bit width; splitting the to-be-processed HDR image with high bit width to obtain N frames of split images which include a first frame to an Nth frame; performing bit width reduction processing on the N frames of split images respectively, to obtain N frames of low-bit-width images; and synthesizing the N frames of low-bit-width images to obtain the HDR image with low bit width.

In an embodiment of the present disclosure, a storage medium having computer instructions stored therein is provided, wherein when the computer instructions are executed, the above method for generating an HDR image with low bit width is performed.

In an embodiment of the present disclosure, a terminal including a memory and a processor is provided, wherein the memory has computer instructions stored therein, and when the processor executes the computer instructions, the above method for generating an HDR image with low bit width is performed.

DETAILED DESCRIPTION

As described in the background, to preserve complete information of HDR data, a signal processing apparatus capable of receiving and processing high-bit-width images is required. A maximum bit width of images that can be processed by existing image processing systems and apparatuses is usually lower than that of HDR images. With the development of HDR technology, there are more and more applications of HDR image processing. To guarantee image accuracy, an image processing system that supports high bit width input is usually required.

Figure 1:
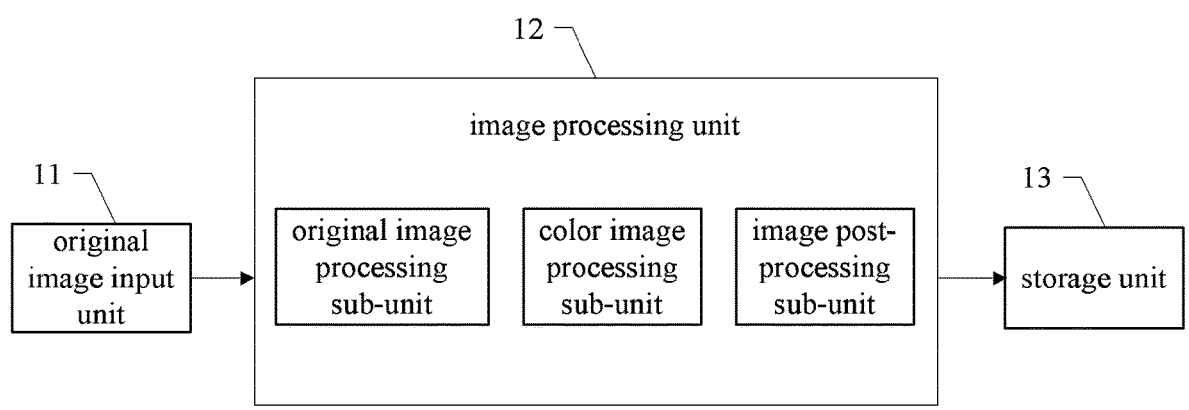
FIG. 1 is a structural diagram of an image processing unit in existing techniques.

Referring to FIG. 1, FIG. 1 is a structural diagram of an image processing unit in existing techniques. An image processing unit 12 is configured to receive an original image from an original image input unit 11 and output the processed original image to a storage unit 13.

Specifically, the image processing unit 12 may include an original image processing sub-unit, a color image processing sub-unit, and an image post-processing sub-unit, and may also include other appropriate modules, which are not described in detail here.

In specific implementation, an image processing process for photographing by a general mobile phone camera is shown in FIG. 1. For example, an image sensor is used to output an image in a Bayer raw format to the image processing unit 12. The image is then subjected to a series of processing, output and saved as an image that is displayable on a display device.

Inventors found based on researches that in existing techniques, multiple frames of low-bit-width images with different exposures are shot for a same scene, and are processed by and then output from the image processing unit 12. The output multiple frames of images are synthesized through multiple exposures to directly generate an HDR image with low bit width. When shooting dynamic scenes, camera displacement and object motion inevitably cause image blur and ghosting of moving objects. It is necessary to perform alignment and ghost removal operations during fusion to ensure better image quality, thereby increasing complexity of the fusion. When the number of frames is great, it is difficult to meet requirements of real-time HDR photography.

The inventors found based on further researches that some current HDR technologies can complete alignment and ghost removal operations at the same time as HDR image generation, which makes alignment and ghost removal easier. Some image sensors with an HDR function can also output ghost-free HDR raw data. However, processing of these HDR raw data always requires a specially designed high-bit-width image processing apparatus, and the HDR raw data is then converted into a low-bit image that is displayable on a display device after dynamic range compression, which limits application of the existing low-bit-width image processing system.

In a specific example, the existing image signal processing system receives 10-bit raw data, and performs bit-width reduction processing on data with a 12-bit or higher bit width, which easily results in a loss in precision of multiple bits and poor image processing effect.

In embodiments of the present disclosure, a to-be-processed HDR image with high bit width is determined and split to obtain N frames of split images which include a first frame to an Nth frame, bit width reduction processing is performed on the N frames of split images respectively to obtain N frames of low-bit-width images, and the N frames of low-bit-width images are synthesized to obtain the HDR image with low bit width. With the embodiments of the present disclosure, the to-be-processed HDR image with high bit width is split to obtain N frames of split images, and bit width reduction processing is performed on the N frames of split images respectively, to obtain N frames of low-bit-width images. Compared with the exiting techniques where image anomaly is caused by retaining high-bit and low-bit information of a high-bit-width HDR image in low-bit-width data by nonlinear compression, in embodiments of the present disclosure, after the to-be-processed HDR image with high bit width is split into N frames of split images, each frame of the low-bit-width image contains at least part of information of a numerical range of the to-be-processed HDR image with high bit width, which enables N frames of low-bit-width images to cover all information of the to-be-processed HDR image with high bit width. Therefore, when the bit width of data is reduced, a precision loss of graphics may be effectively reduced, and better image processing effect may be achieved.

In order to clarify the objects, characteristics and advantages of the disclosure, embodiments of present disclosure will be described in detail in conjunction with accompanying drawings.

Figure 2:
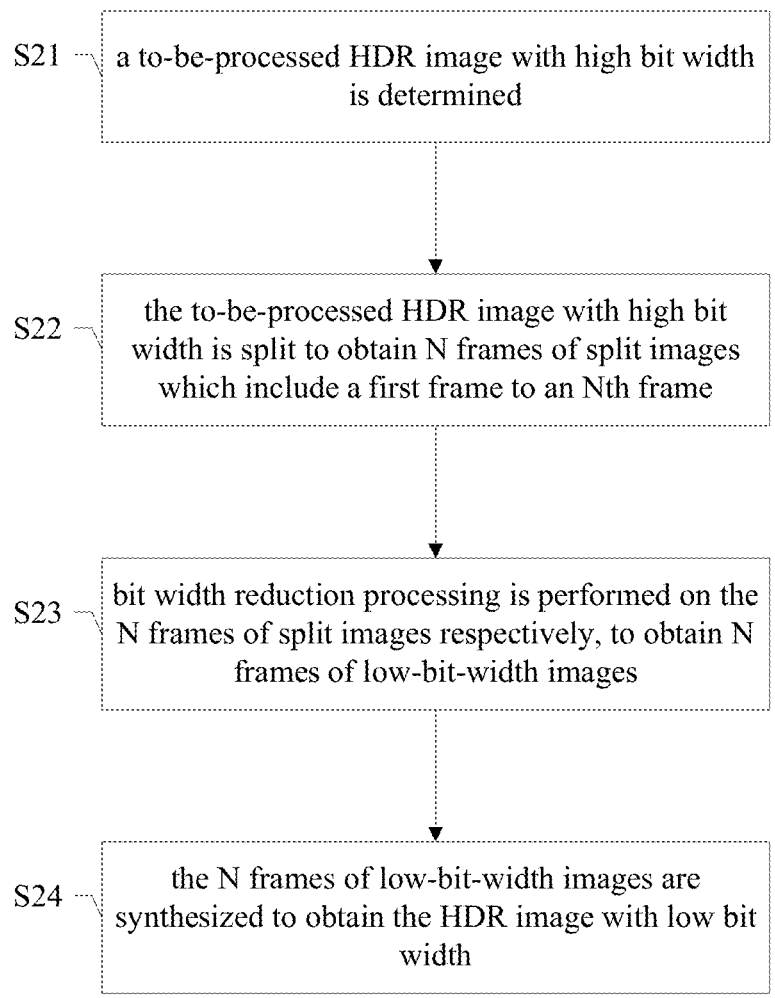
FIG. 2 is a flow chart of a method for generating an HDR image with low bit width according to an embodiment.

FIG. 2 is a flow chart of a method for generating an HDR image with low bit width according to an embodiment. Referring to FIG. 2, the method includes S21 to S24.

In S21, a to-be-processed HDR image with high bit width is determined.

In S22, the to-be-processed HDR image with high bit width is split to obtain N frames of split images which include a first frame to an Nth frame.

In S23, bit width reduction processing is performed on the N frames of split images respectively, to obtain N frames of low-bit-width images.

In S24, the N frames of low-bit-width images are synthesized to obtain the HDR image with low bit width.

It could be understood that, in some embodiments, the method may be implemented in a form of a software program which runs in a processor integrated inside a chip or a chip module.

In some embodiments, in S21, an HDR RAW image with high bit width may be input, where the bit width is higher than that processed by an existing ISP system. That is, when data bit width processed by the existing ISP system is 10 bits, the data bit width of the input image may be 12, 14, 16, 20, 24 bits, etc.

In some embodiments, in S22, the to-be-processed HDR image with high bit width is split to obtain N frames of split images.

Figure 3:
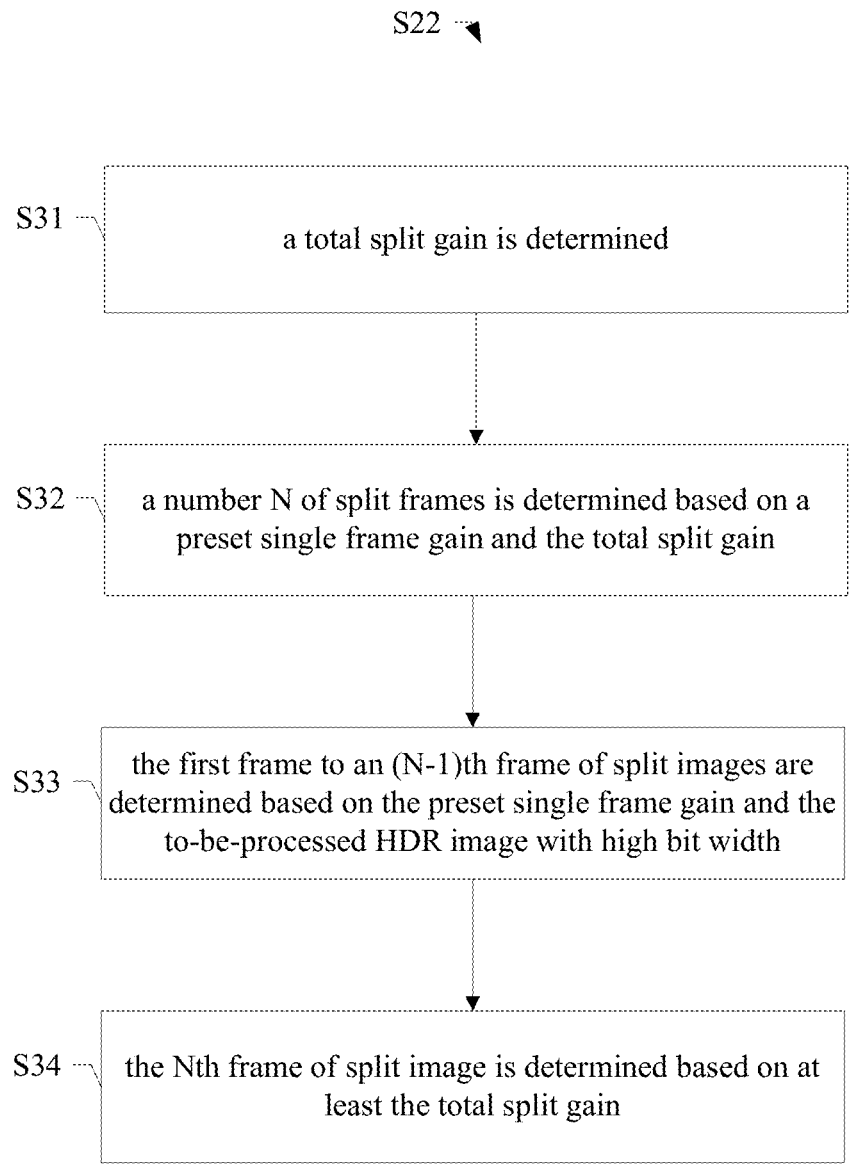
FIG. 3 is a flow chart of S21 as shown in FIG. 2 according to an embodiment.

FIG. 3 is a flow chart of S22 as shown in FIG. 2 according to an embodiment. Said splitting the to-be-processed HDR image with high bit width may include S31 to S34 which are described below.

In S31, a total split gain is determined.

In some embodiments, to better retain both high-brightness details and low-brightness details of the original image in the split images, a brightness gain that needs to be improved in the low-brightness part of the image may be estimated according to a pixel value distribution of the originally input image.

In some embodiments, the total split gain may be determined based on a lower limit value of the first preset pixel probability range.

Figure 4:
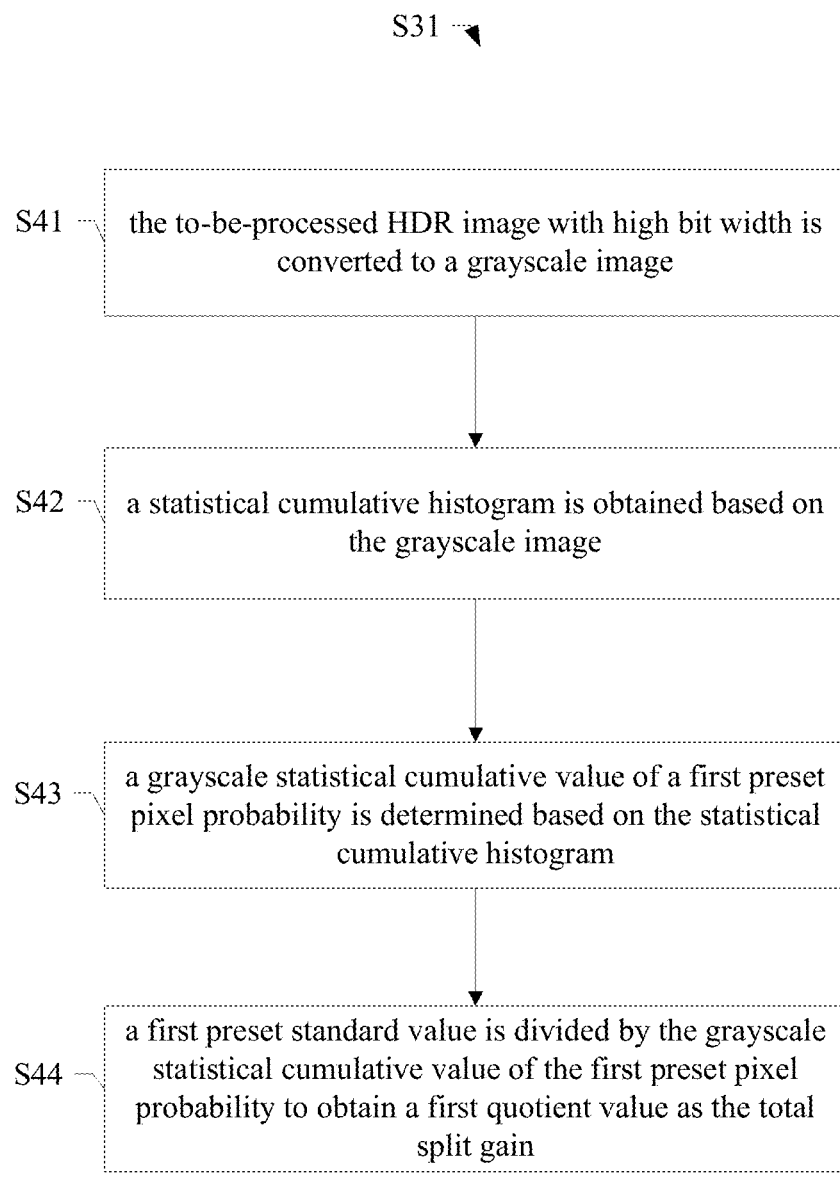
FIG. 4 is a flow chart of S31 as shown in FIG. 3 according to an embodiment.

FIG. 4 is a flow chart of S31 as shown in FIG. 3 according to an embodiment. Said determining the total split gain may include S41 to S44 which are described below.

In S41, the to-be-processed HDR image with high bit width is converted to a grayscale image.

Specifically, a conventional grayscale image conversion technology may be used to convert the HDR image with high bit width into a grayscale image, and in the embodiments of the present disclosure, there is no limitation on a specific grayscale image conversion technology.

In S42, a statistical cumulative histogram is obtained based on the grayscale image.

Figure 5:
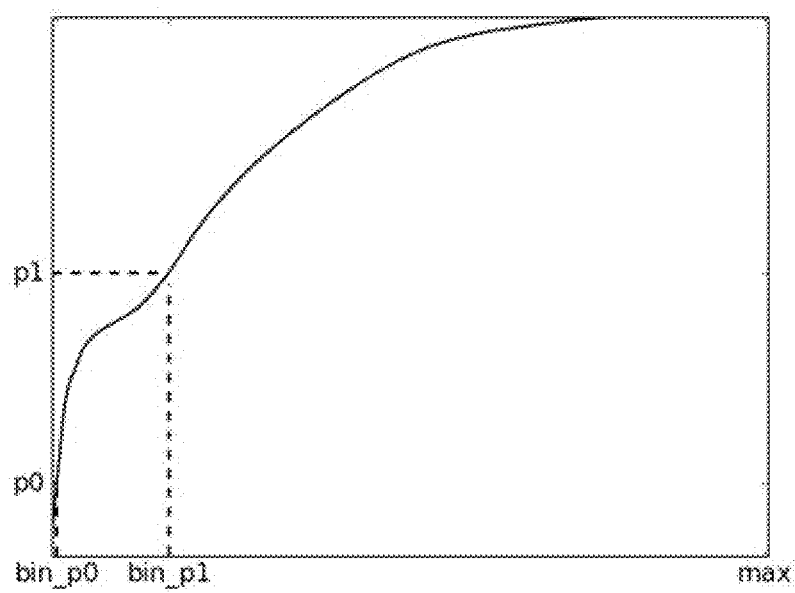
FIG. 5 is a diagram of a cumulative histogram according to an embodiment.

Referring to FIG. 5, FIG. 5 is a diagram of a cumulative histogram according to an embodiment.

Specifically, the input image may be converted into a grayscale image and the cumulative histogram may be counted, where a pixel probability distribution range [p0, p1] is preset as a to-be-counted area which is usually a low-brightness area and is subjected to highlight processing with a calculated gain subsequently.

The cumulative histogram may be regarded as a function of gray level and used to represent the number of pixels with a certain gray level in the image, which reflects the frequency of certain gray levels in the image. FIG. 5 illustrates a maximum value bin_p1 and a minimum value bin_p0.

It should be noted that a conventional statistical technique may be used to count the cumulative histogram of the grayscale image, which is not limited in the embodiments of the present disclosure.

In S43, a grayscale statistical cumulative value of a first preset pixel probability is determined based on the statistical cumulative histogram.

Further, the first preset pixel probability is a lower limit value of a first preset pixel probability range.

The first preset pixel probability range may be the to-be-counted area [p0, p1], or other appropriate areas. Each area may be represented by a minimum probability (i.e., the lower limit value of the preset pixel probability range) and a maximum probability (i.e., the upper limit value of the preset pixel probability range).

In S44, a first preset standard value is divided by the grayscale statistical cumulative value of the first preset pixel probability to obtain a first quotient value as the total split gain.

Specifically, the first preset standard value may be divided by the lower limit value of the first preset pixel probability range to obtain a first quotient value as the total split gain:

$$G\_total = target\_0/bin\_p0$$

where G_total is the total split gain, target_0 is the first preset standard value, and bin_0 is the lower limit value of the first preset pixel probability range.

In the embodiments, by setting the first preset standard value, it is beneficial to adjust the total split gain in time by adjusting the first standard value according to actual situations.

In embodiments of the present disclosure, by setting the first preset pixel probability as the lower limit value of the first preset pixel probability range, a smaller total split gain may be obtained, so that the obtained HDR image with low bit width has a relatively small gain to prevent the image from being adjusted too bright, which is more suitable for bright scenes, such as daytime scenes.

Referring to FIG. 3, in some embodiments, in S31, the total split gain may be determined based on an upper limit value of the first preset pixel probability range.

Figure 6:
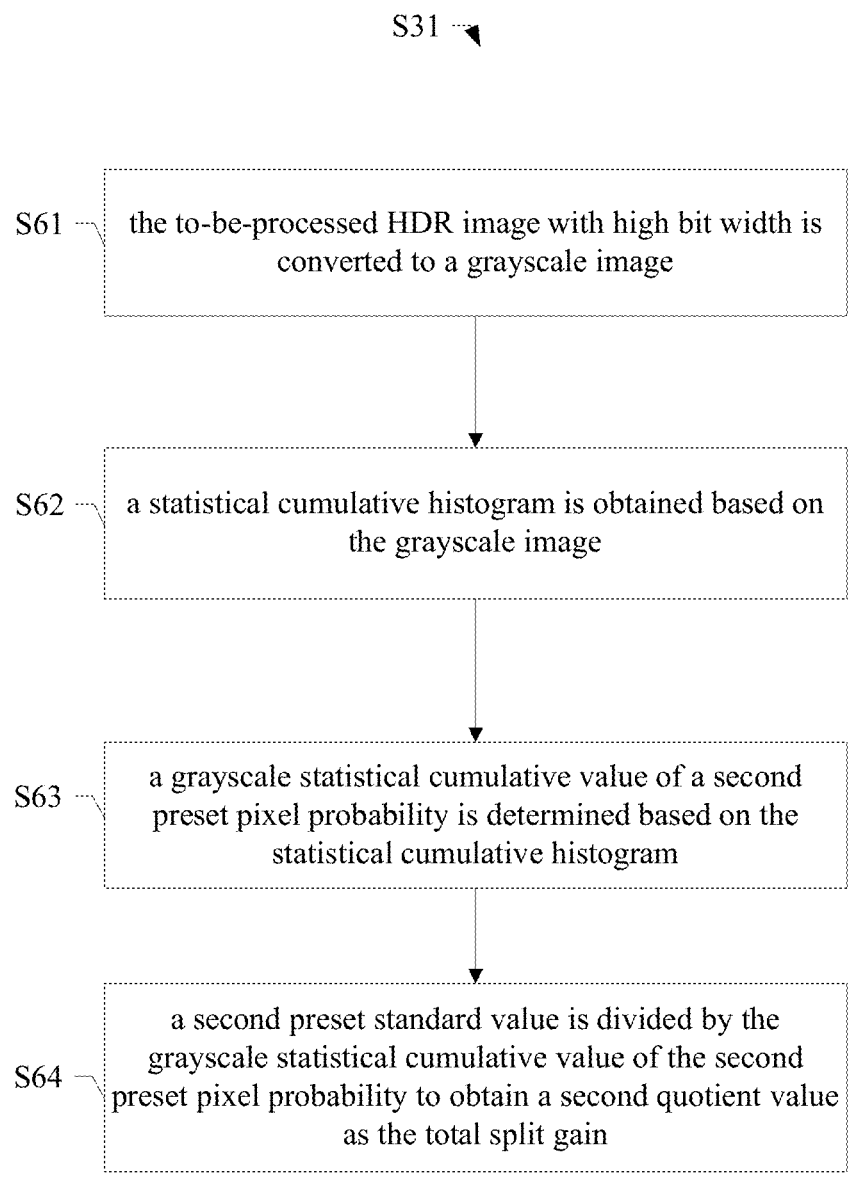
FIG. 6 is a flow chart of S31 as shown in FIG. 3 according to an embodiment.

FIG. 6 is a flow chart of S31 as shown in FIG. 3 according to an embodiment. Said determining the total split gain may include S61 to S64 which are described below.

In S61, the to-be-processed HDR image with high bit width is converted to a grayscale image.

In S62, a statistical cumulative histogram is obtained based on the grayscale image.

Specifically, the cumulative histogram may be referred to the cumulative histogram as shown in FIG. 5.

Specifically, the input image may be converted into a grayscale image and the cumulative histogram may be counted, where a pixel probability distribution range [p0, p1] is preset as a to-be-counted area which is usually a low-brightness area and is subjected to highlight processing with a calculated gain subsequently.

The cumulative histogram may be regarded as a function of gray level and used to represent the number of pixels with a certain gray level in the image, which reflects the frequency of certain gray levels in the image. FIG. 5 illustrates a maximum value bin_p1 and a minimum value bin_p0.

In S63, a grayscale statistical cumulative value of a second preset pixel probability is determined based on the statistical cumulative histogram.

Further, the second preset pixel probability is an upper limit value of a second preset pixel probability range.

The second preset pixel probability range may be the to-be-counted area [p0, p1], or other appropriate areas. Each area may be represented by a minimum probability (i.e., the lower limit value of the preset pixel probability range) and a maximum probability (i.e., the upper limit value of the preset pixel probability range).

In S64, a second preset standard value is divided by the grayscale statistical cumulative value of the second preset pixel probability to obtain a second quotient value as the total split gain.

Specifically, the second preset standard value may be divided by the upper limit value of the second preset pixel probability range to obtain a second quotient value as the total split gain:

$$G\_total = target\_1/bin\_p1,$$

where G_total is the total split gain, target_1 is the second preset standard value, and bin_p1 is the upper limit value of the second preset pixel probability range.

In the embodiments, by setting the second preset standard value, it is beneficial to adjust the total split gain in time by adjusting the second standard value according to actual situations.

In embodiments of the present disclosure, by setting the second preset pixel probability as the upper limit value of the second preset pixel probability range, a larger total split gain may be obtained, so that the obtained HDR image with low bit width has a relatively large gain to avoid the image being adjusted too dim, which is more suitable for dim scenes, such as night scenes.

Referring to FIG. 3, in some embodiments, in S31, the total split gain may be determined based on an average value of a third preset pixel probability range.

Figure 7:
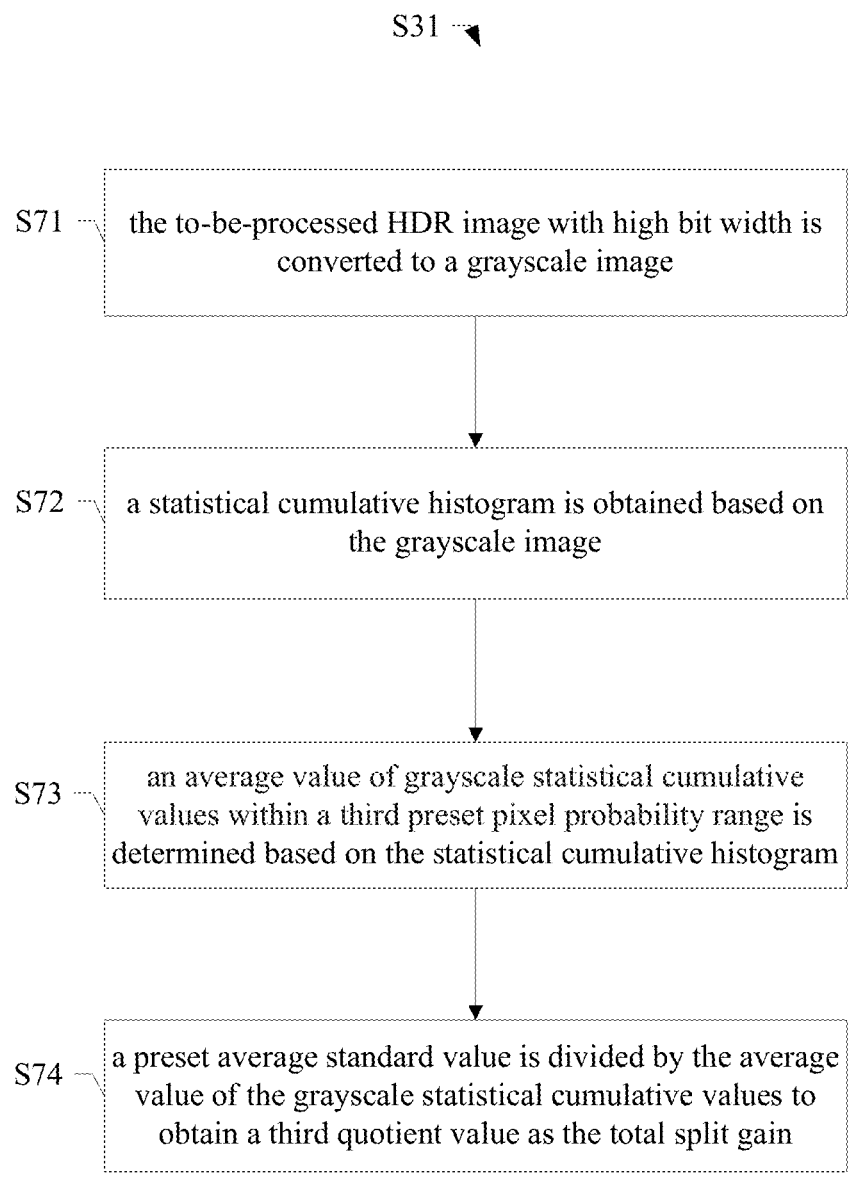
FIG. 7 is a flow chart of S31 as shown in FIG. 3 according to an embodiment.

FIG. 7 is a flow chart of S31 as shown in FIG. 3 according to an embodiment. Said determining the total split gain may include S71 to S74 which are described below.

In S71, the to-be-processed HDR image with high bit width is converted to a grayscale image.

In S72, a statistical cumulative histogram is obtained based on the grayscale image.

Specifically, the cumulative histogram may be referred to the cumulative histogram as shown in FIG. 5.

Specifically, the input image may be converted into a grayscale image and the cumulative histogram may be counted, where a pixel probability distribution range [p0, p1] is preset as a to-be-counted area which is usually a low-brightness area and is subjected to highlight processing with a calculated gain subsequently.

The cumulative histogram may be regarded as a function of gray level and used to represent the number of pixels with a certain gray level in the image, which reflects the frequency of certain gray levels in the image. For example, in FIG. 5, an average value bin_avg may be calculated based on the number of pixels between a maximum value bin_p1 and a minimum value bin_p0.

In S73, an average value of grayscale statistical cumulative values within a third preset pixel probability range is determined based on the statistical cumulative histogram.

The third preset pixel probability range may be the to-be-counted area [p0, p1], or other appropriate areas. Each area may be represented by a minimum probability (i.e., the lower limit value of the preset pixel probability range) and a maximum probability (i.e., the upper limit value of the preset pixel probability range), and an average value may be calculated based on the number of pixels between a maximum value and a minimum value.

In S74, a preset average standard value is divided by the average value of the grayscale statistical cumulative values to obtain a third quotient value as the total split gain.

Specifically, the preset average standard value is divided by the average value of the grayscale statistical cumulative values to obtain a third quotient value as the total split gain:

$$G\_total = target\_avg/bin\_avg,$$

where G_total is the total split gain, target_avg is the preset average standard value, and bin_avg is the average value of the grayscale statistical cumulative values.

In the embodiments, by setting the preset average standard value, it is beneficial to adjust the total split gain in time by adjusting the average standard value according to actual situations.

In embodiments of the present disclosure, by setting the average value of grayscale statistical cumulative values within the third preset pixel probability range, a modest total split gain may be obtained, so that the obtained HDR image with low bit width has a modest gain to avoid the image being adjusted too bright or too dim, which is more suitable for routine scenes.

Referring to FIG. 3, in S32, a number N of split frames is determined based on a preset single frame gain and the total split gain.

Specifically, the number N of split frames is determined based on the preset single frame gain and the total split gain by using a following formula:

$$N=\lceil \log 2(G\_total)/\log 2(G\_delta)\rceil+1,$$

where G_total is the total split gain, G_delta is the preset single frame gain, and ⌈ ⌉ represents round up to an integer.

In S33, the first frame to an (N-1)th frame of split images are determined based on the preset single frame gain and the to-be-processed HDR image with high bit width.

In some embodiments, said determining the first frame to an (N-1)th frame of split images based on the preset single frame gain and the to-be-processed HDR image with high bit width includes: multiplying the to-be-processed HDR image with high bit width by (N-2) G_deltas to obtain the (N-1)th frame of split image, where G_delta is the preset single frame gain, and N≥2.

In some embodiments, following split images may be acquired.

The first frame is the original frame, which is the HDR image with high bit width;

the second frame is the first frame×G_delta;

the third frame is the second frame×G_delta;

. . . and the (N-1)th frame is the (N-2)th frame×G_delta.

In S34, the Nth frame of split image is determined based on at least the total split gain.

In some embodiments, said determining the Nth frame of split image based on at least the total split gain includes: determining that the Nth frame of split image is a product of the (N-1)th frame of split image and an N frame gain.

That is, the Nth frame is the (N-1)th frame×(G_total/(G_delta^(N-2))), where the N frame gain is G_total/(G_delta^(N-2)), G_total is the total split gain, and G_delta is the preset single frame gain.

In some embodiments, said determining the Nth frame of split image based on at least the total split gain includes: determining that the Nth frame of split image is a product of the to-be-processed HDR image with high bit width and the total split gain.

That is, the Nth frame is the original frame×G_total, where G_total is the total split gain.

In the embodiments of the present disclosure, by determining the total split gain and pre-setting the single frame gain, the number of frames N is determined, and the first (N-1) frames of split images and the Nth frame of split image can be determined in different ways. In this manner, the (N-1) frames of split images respectively contain at least a portion of information of the to-be-processed HDR image with high bit width, and information amount of the (N-1) frames of split images may be different to form a transition. Further, there is an opportunity to set the Nth frame of split image to avoid the image to be affected merely by the single frame gain, thereby further improving image processing effect by setting multiple parameters.

Referring to FIG. 2, in some embodiments, in S23, bit width reduction processing is performed on the first frame to the Nth frame of split images respectively, to obtain N frames of low-bit-width images.

In some embodiments, a conventional bit width reduction processing technique may be used, which is not limited in the embodiments of the present disclosure.

In some embodiments, in S24, said synthesizing the N frames of low-bit-width images to obtain the HDR image with low bit width includes: inputting the N frames of low-bit-width images into an ISP to output processed N frames of low-bit-width images; and performing fusion processing on the processed N frames of low-bit-width images to obtain the HDR image with low bit width.

Specifically, each split image is input into the ISP, and usually the image processed by and output from the ISP is a low-bit-width image that is displayable on a display device. Then the image signal processing unit outputs N frames of low-bit-width images with different brightness which are fused into one frame of HDR image with low bit width. More specifically, a multi-exposure image HDR synthesis method may be selected for fusion, which is not limited in the embodiments of the present disclosure.

In embodiments of the present disclosure, the to-be-processed HDR image with high bit width is split to obtain N frames of split images, and bit width reduction processing is performed on the N frames of split images respectively, to obtain N frames of low-bit-width images. Compared with the exiting techniques where image anomaly is caused by retaining high-bit and low-bit information of a high-bit-width HDR image in low-bit-width data by nonlinear compression, in embodiments of the present disclosure, after the to-be-processed HDR image with high bit width is split into N frames of split images, each frame of the low-bit-width image contains at least part of information of a numerical range of the to-be-processed HDR image with high bit width, which enables N frames of low-bit-width images to cover all information of the to-be-processed HDR image with high bit width. Therefore, when the bit width of data is reduced, a precision loss of graphics may be effectively reduced, and better image processing effect may be achieved.

Figure 8:
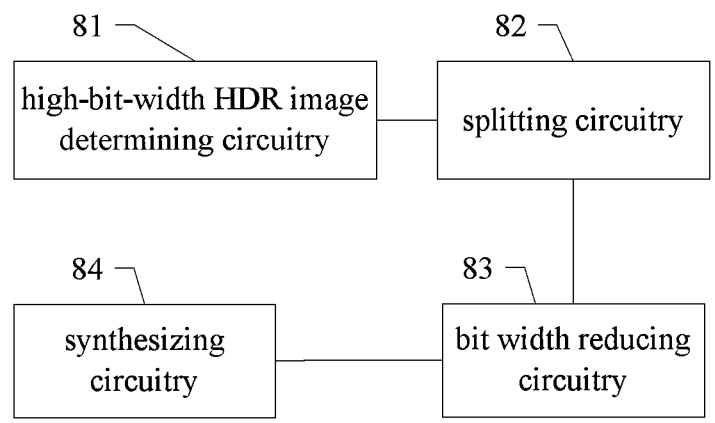
FIG. 8 is a structural diagram of an apparatus for generating an HDR image with low bit width according to an embodiment.

Referring to FIG. 8, FIG. 8 is a structural diagram of an apparatus for generating an HDR image low bit width according to an embodiment. The apparatus includes a high-bit-width HDR image determining circuitry 81, a splitting circuitry 82, a bit width reducing circuitry 83 and a synthesizing circuitry 84.

The high-bit-width HDR image determining circuitry 81 is configured to determine a to-be-processed HDR image with high bit width.

The splitting circuitry 82 is configured to split the to-be-processed HDR image with high bit width to obtain N frames of split images which include a first frame to an Nth frame.

The bit width reducing circuitry 83 is configured to perform bit width reduction processing on the N frames of split images respectively, to obtain N frames of low-bit-width images.

The synthesizing circuitry 84 is configured to synthesize the N frames of low-bit-width images to obtain the HDR image with low bit width.

In some embodiments, the above apparatus may correspond to a chip with a data processing function in a UE, such as a baseband chip, or correspond to a chip module having a chip with a data processing function in a UE or correspond to a UE.

More details on principles, implementations and advantages of the apparatus may be referred to relevant descriptions of the method as mentioned above and illustrated in FIGS. 2 to 7, which are not repeated here.

In an embodiment of the present disclosure, a storage medium having computer instructions stored therein is provided, wherein when the computer instructions are executed, the above method for generating an HDR image with low bit width is performed. In some embodiments, the storage medium may be a computer readable storage medium, and may include a non-volatile or a non-transitory memory, or include an optical disk, a hard disk drive or a solid state disk.

In an embodiment of the present disclosure, a terminal including a memory and a processor is provided, wherein the memory has computer instructions stored therein, and when the processor executes the computer instructions, the above method for generating an HDR image with low hit width is performed. The terminal includes but is not limited to a mobile phone, a computer or a tablet computer.

Modules/units included in each apparatus and product described in the above embodiments may be software modules/units, hardware modules/units, or a combination of software modules/units and hardware modules/units. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for generating a High Dynamic Range (HDR) image with low bit width, comprising:
determining a to-be-processed HDR image with high bit width;
splitting the to-be-processed HDR image with high bit width to obtain N frames of split images which comprise a first frame to an Nth frame;
performing bit width reduction processing on the N frames of split images respectively, to obtain N frames of low-bit-width images; and
synthesizing the N frames of low-bit-width images to obtain the HDR image with low bit width.

2. The method according to claim 1, wherein said splitting the to-be-processed HDR image with high bit width comprises:
determining a total split gain;
determining a number N of split frames based on a preset single frame gain and the total split gain;
determining the first frame to an (N-1)th frame of split images based on the preset single frame gain and the to-be-processed HDR image with high bit width; and
determining the Nth frame of split image based on at least the total split gain.

3. The method according to claim 2, wherein said determining a total split gain comprises:
converting the to-be-processed HDR image with high bit width to a grayscale image;
obtaining a statistical cumulative histogram based on the grayscale image;
determining a grayscale statistical cumulative value of a first preset pixel probability based on the statistical cumulative histogram; and
dividing a first preset standard value by the grayscale statistical cumulative value of the first preset pixel probability to obtain a first quotient value as the total split gain.

4. The method according to claim 3, wherein the first preset pixel probability is a lower limit value of a first preset pixel probability range.

5. The method according to claim 2, wherein said determining a total split gain comprises:
converting the to-be-processed HDR image with high bit width to a grayscale image;
obtaining a statistical cumulative histogram based on the grayscale image;
determining a grayscale statistical cumulative value of a second preset pixel probability based on the statistical cumulative histogram; and
dividing a second preset standard value by the grayscale statistical cumulative value of the second preset pixel probability to obtain a second quotient value as the total split gain.

6. The method according to claim 5, wherein the second preset pixel probability is an upper limit value of a second preset pixel probability range.

7. The method according to claim 2, wherein said determining a total split gain comprises:
converting the to-be-processed HDR image with high bit width to a grayscale image;
obtaining a statistical cumulative histogram based on the grayscale image;
determining an average value of grayscale statistical cumulative values within a third preset pixel probability range based on the statistical cumulative histogram; and
dividing a preset average standard value by the average value of the grayscale statistical cumulative values to obtain a third quotient value as the total split gain.

8. The method according to claim 2, wherein the number N of split frames is determined based on the preset single frame gain and the total split gain by using a following formula:

$$N=[\log 2(G\_total)/\log 2(G\_delta)]+1,$$

where G_total is the total split gain, and G_delta is the preset single frame gain.

9. The method according to claim 2, wherein said determining the first frame to an (N-1)th frame of split images based on the preset single frame gain and the to-be-processed HDR image with high bit width comprises:

multiplying the to-be-processed HDR image with high bit width by (N-2) G_deltas to obtain the (N-1)th frame of split image, where G_delta is the preset single frame gain, and N≥2.

10. The method according to claim 2, wherein said determining the Nth frame of split image based on at least the total split gain comprises:

determining that the Nth frame of split image is a product of the (N-1)th frame of split image and an N frame gain, where the N frame gain is G_total/(G_delta^(N-2)), G_total is the total split gain, and G_delta is the preset single frame gain.

11. The method according to claim 2, wherein said determining the Nth frame of split image based on at least the total split gain comprises:

determining that the Nth frame of split image is a product of the to-be-processed HDR image with high bit width and the total split gain.

12. The method according to claim 1, wherein said synthesizing the N frames of low-bit-width images to obtain the HDR image with low bit width comprises:

inputting the N frames of low-bit-width images into an Image Signal Processor (ISP) to output processed N frames of low-bit-width images, and performing fusion processing on the processed N frames of low-bit-width images to obtain the HDR image with low bit width.

13. A non-transitory storage medium storing one or more programs, the one or more programs comprising computer instructions, which, when executed by a processor, cause the processor to:

determine a to-be-processed HDR image with high bit width;

split the to-be-processed HDR image with high bit width to obtain N frames of split images which comprise a first frame to an Nth frame;

perform bit width reduction processing on the N frames of split images respectively, to obtain N frames of low-bit-width images; and synthesize the N frames of low-bit-width images to obtain an HDR image with low bit width.

14. A terminal comprising a memory and a processor, wherein the memory stores one or more programs, the one or more programs comprising computer instructions, which, when executed by the processor, cause the processor to:

determine a to-be-processed HDR image with high bit width;

split the to-be-processed HDR image with high bit width to obtain N frames of split images which comprise a first frame to an Nth frame;

perform bit width reduction processing on the N frames of split images respectively, to obtain N frames of low-bit-width images; and synthesize the N frames of low-bit-width images to obtain an HDR image with low bit width.

15. The terminal according to claim 14, wherein said splitting the to-be-processed HDR image with high bit width comprises:

determining a total split gain;

determining a number N of split frames based on a preset single frame gain and the total split gain;

determining the first frame to an (N-1)th frame of split images based on the preset single frame gain and the to-be-processed HDR image with high bit width; and determining the Nth frame of split image based on at least the total split gain.

16. The terminal according to claim 15, wherein said determining a total split gain comprises:

converting the to-be-processed HDR image with high bit width to a grayscale image;

obtaining a statistical cumulative histogram based on the grayscale image;

determining a grayscale statistical cumulative value of a first preset pixel probability based on the statistical cumulative histogram; and dividing a first preset standard value by the grayscale statistical cumulative value of the first preset pixel probability to obtain a first quotient value as the total split gain.

17. The terminal according to claim 16, wherein the first preset pixel probability is a lower limit value of a first preset pixel probability range.

18. The terminal according to claim 15, wherein said determining a total split gain comprises:

converting the to-be-processed HDR image with high bit width to a grayscale image;

obtaining a statistical cumulative histogram based on the grayscale image;

determining a grayscale statistical cumulative value of a second preset pixel probability based on the statistical cumulative histogram, and dividing a second preset standard value by the grayscale statistical cumulative value of the second preset pixel probability to obtain a second quotient value as the total split gain.

19. The terminal according to claim 18, wherein the second preset pixel probability is an upper limit value of a second preset pixel probability range.

20. The terminal according to claim 15, wherein said determining a total split gain comprises:

converting the to-be-processed HDR image with high bit width to a grayscale image;

obtaining a statistical cumulative histogram based on the grayscale image;

determining an average value of grayscale statistical cumulative values within a third preset pixel probability range based on the statistical cumulative histogram; and dividing a preset average standard value by the average value of the grayscale statistical cumulative values to obtain a third quotient value as the total split gain.

* * * * *